UNITED STATES PATENT OFFICE

ERNST HONOLD, OF FRANKFORT-ON-THE-MAIN-FECHENHEIM, AND GEORG BOEHNER, OF FRIEDRICHSFELD IN BADEN, GERMANY, ASSIGNORS TO GENERAL ANILINE WORKS, INC., OF NEW YORK, N. Y., A CORPORATION OF DELAWARE

PROCESS OF MAKING NITROGENOUS VAT DYESTUFFS OF THE ACRIDINE SERIES

No Drawing. Application filed June 15, 1931, Serial No. 544,702, and in Germany July 1, 1930.

Our present invention relates to a process of making nitrogenous vat dyestuffs which consists in condensing a product corresponding to the general formula

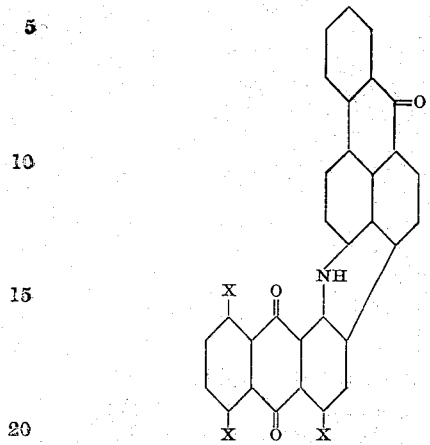

wherein two X's mean hydrogen and one X represents the amino-group, with an aromatic compound which contains in its molecule at least one replaceable halogen or nitro group. The aforesaid starting materials are obtainable by subjecting a bz.1-benzanthronyl-1-amino-4- or -5- or -8-aminoanthraquinone to the action of an alkaline condensing agent according to U. S. Patent No. 995,936.

The present condensation reaction is advantageously carried out by heating the components together in the presence of a high boiling solvent or diluent with the addition of an acid binding agent and a suitable catalyst such as a copper compound.

The condensation products obtained according to the present process are, when dry, grayish powders soluble in concentrated sulfuric acid with a greenish coloration. They dye the vegetable fiber from a bluish to violet to black vat gray shades of a good fastness particularly to light and exposure.

The dyestuffs are identical with those obtainable by heating with an alkaline condensing agent bz.1-benzanthronyl-1-amino-anthraquinone bodies containing in 4-, 5-, or 8- position of the anthraquinone nucleus an NH-aryl group according to U. S. application Ser. No. 521,502, filed by Ernst Honold January 30, 1931.

According to the present process, the aryl-residue which influences the valuable shade of the end products, is introduced into the molecule subsequent to the alkaline condensation, a fact which is of advantage, since also such aryl residues can be introduced which are not insensitive to the action of melting alkalies.

The dyestuffs obtained by condensation with aromatic compounds containing a vat-table aryl residue, particularly an anthraquinonyl-residue, are especially valuble as to shade and fastness of the dyeings obtained therewith.

It is a remarkable fact that when after-treating the present dyestuffs with an acid condensing agent their solubility in the vat is substantially increased whereby the leveling power of the dyestuffs is favorably influenced. In many cases the aftertreatment may be effected advantageously by melting aluminium chloride or sodium-aluminium chloride or by acting with strong acids. Sometimes the aftertreatment involves a change of shade towards brown. When acting with sulfuric acid, fuming sulfuric acid or chlorosulfonic acid sulfonation of the dyestuffs is easily effected. In many cases it is sufficient for this purpose to dissolve the dyestuffs in concentrated sulfuric acid at ordinary temperatures.

In order to further illustrate our invention, the following examples are given, the parts being by weight and all temperatures in centigrade degrees. However, it is to be understood that our invention is not limited to the particular products nor reacting conditions mentioned therein:

*Example 1*

50 parts of the condensation product, obtained by treating bz.1-benzanthronyl-1-amino-5-amino-anthraquinone with an alcoholic caustic potash solution, are boiled under reflux in the presence of 30 parts of anhydrous sodium acetate and 0.5 parts of cuprous chloride with 70 parts of tetra-bromo-benzene in 600 parts of nitrobenzene for about 8 hours. The dyestuff thus formed is sucked off and washed. It is advantageously redissolved in concentrated sulfuric acid, whereby the solution shows a green coloration, and precipitated with water. With hydrosulfite and a caustic soda solution it forms a violet-blue vat, from which cotton is dyed fast grayish blue shades. It corresponds probably to the following formula

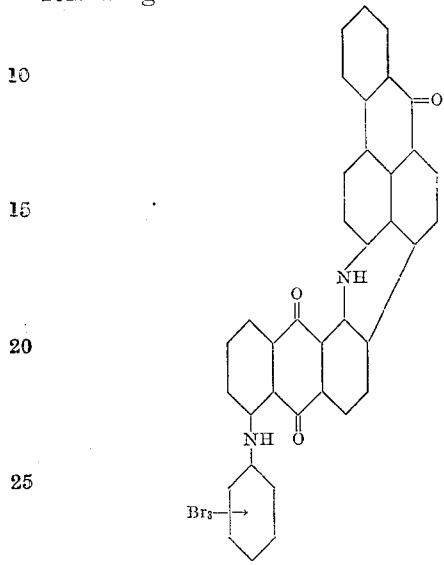

*Example 2*

50 parts of the starting material used in Example 1 are condensed with 70 parts of dinitrochloro-benzene. The dyestuff thus obtained dyes cotton from a bluish violet vat fast olive-gray shades and corresponds probably to the following formula

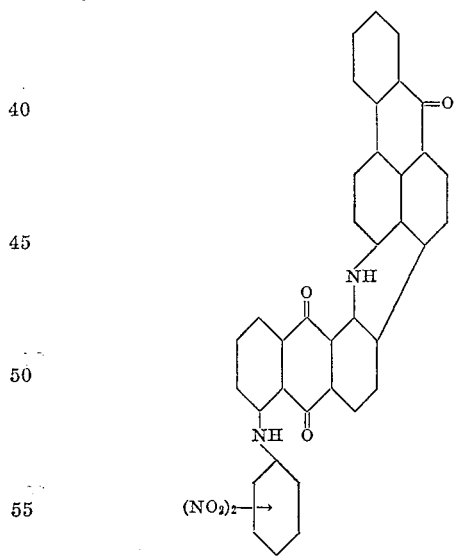

*Example 3*

A mixture of 50 parts of the starting material of Example 1 and 30 parts of 1-chloro-anthraquinone is boiled under reflux, while stirring, in the presence of 25 parts of anhydrous potassium carbonate and 2 parts of cuprous chloride in about 700 parts of naphthalene for about 8 hours. After having been diluted with 400 parts of chlorobenzene, the warm fusion mass is sucked off, washed with alcohol and water. The condensation product dissolves in concentrated sulfuric acid with a yellowish green color, immediately turning into a bluish green. It dyes cotton from a black-violet vat pure gray shades of a particular fastness to light and exposure. It corresponds probably to the following formula

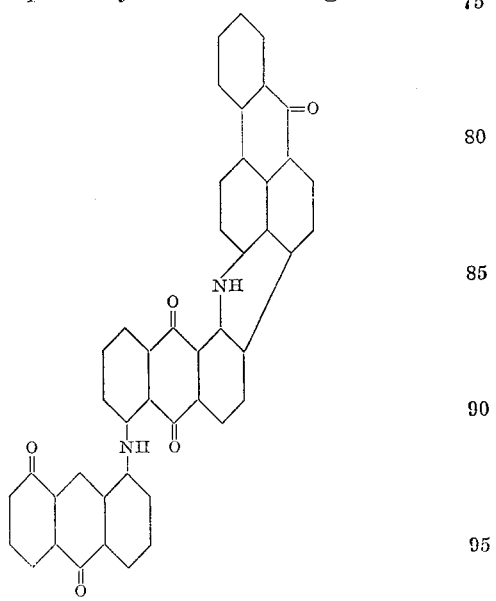

By further treatment with acidic agents as, for instance, with chlorosulfonic acid, it dyes cotton from a dark bluish black vat bluish gray shades. When subjecting the dyestuff to a sodium-aluminium chloride fusion at about 170°, it dyes cotton from a bluish vat olive shades.

*Example 4*

By replacing in the foregoing example the 1-chloro-anthraquinone by the same amount of 2-chloro-anthraquinone, a dyestuff is obtained which corresponds probably to the following formula

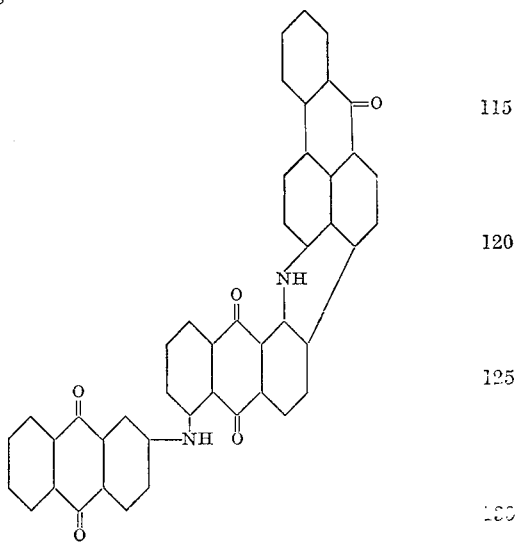

and dyes cotton from a dark violet vat reddish gray shades of a good fastness particularly to light and exposure.

Example 5

50 parts of the condensation product obtained by treating bz.1-benzanthronyl-1-amino-4-aminoanthraquinone with an alcoholic potash solution, are condensed according to Example 3 with 30 parts of 1-chloro-anthraquinone. The dyestuff thus obtained dyes cotton from a dark brownish black vat fast gray-olive shades. It dissolves in concentrated sulfuric acid with an olive color and corresponds probably to the following formula

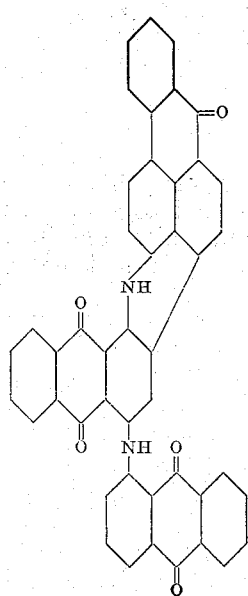

A dyestuff with similar properties is obtained by using instead of 1-chloro-anthraquinone the same amount of 2-chloro-anthraquinone.

The dyestuffs are practically identical with the condensation products, obtained by treating bz.1-benzanthronyl-4-amino-1.1'- or 1.2'-dianthrimide with an alcoholic caustic potassium solution.

Example 6

50 parts of the condensation product, obtained by treating bz.1-benzanthronyl-1-amino-8-amino-anthraquinone with an alcoholic caustic potash solution, are condensed with 1-chloro-anthraquinone according to Example 3. The condensation product thus obtained dissolves in concentrated sulfuric acid with a green coloration and dyes cotton from a violet-black vat gray shades which show excellent properties of fastness. It corresponds probably to the following formula

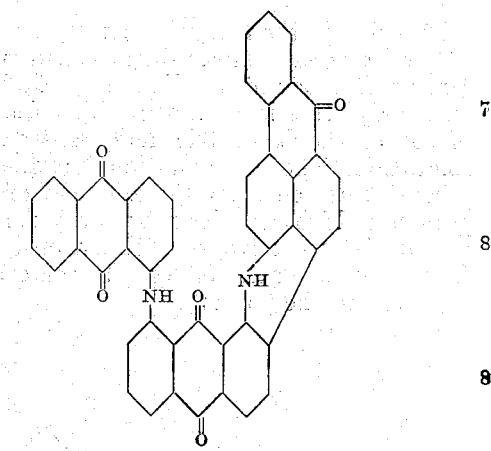

The dyestuff thus obtained by using 2-chloro-anthraquinone, dyes cotton from a dark bluish black vat gray shades and is also distinguished by its valuable properties.

By after-treatment at moderate temperature of the condensation products with acidic agents, similar gray dyeing dyestuffs are obtained which are distinguished by an improved fastness to chlorine and leveling power.

Example 7

50 parts of the starting material described in Example 1 and 37 parts of bz.4-bromo-(1.2)-benzanthraquinone are boiled under reflux with 3 parts of copper acetate and 27 parts of anhydrous sodium acetate in 220 parts of nitrobenzene for about 3 hours. When cool, the fusion mass is sucked off, and, in order to remove any adherent nitrobenzene from the residue, it may be purified by treating it with steam. The reaction product dissolves with a yellowish green coloration in concentrated sulfuric acid and precipitates in the form of greenish black flakes when diluted with water. Cotton is dyed from a reddish brown vat gray shades.

Example 8

50 parts of the starting material used in Example 1 and 50 parts of the halogen-anthraquinone-acridone, obtained by treating anthraquinone-1.2-acridone with sulfuryl chloride, are boiled under reflux with 14 parts of anhydrous sodium acetate and 4 parts of copper acetate in 260 parts of nitrobenzene for about 3 hours. By further treating the mass, as usual, a black powder is obtained which dissolves in concentrated sulfuric acid with a green coloration which turns to olive after the addition of some paraformaldehyde. The dyestuff forms a turbid violet vat from which cotton is dyed fast gray to black-gray shades.

Example 9

By using in the foregoing example instead of the halogen-anthraquinone-acridone described 15 parts of 1.5-dichloro-anthraquinone, a dyestuff is obtained which dissolves in concentrated sulfuric acid with a green coloration. The latter solution shows a bluish green coloration after the addition of some paraformaldehyde. The dyestuff forms a turbid violet vat from which cotton is dyed fast gray to black shades. It corresponds probably to the formula product corresponding to the general formula

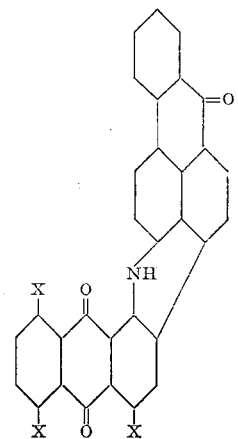

wherein two X's mean hydrogen and one X represents the amino-group, with an aromatic compound which contains in its molecule at least one replaceable halogen or nitro group.

2. A process for producing nitrogenous vat dyestuffs which comprises condensing a product corresponding to the general formula

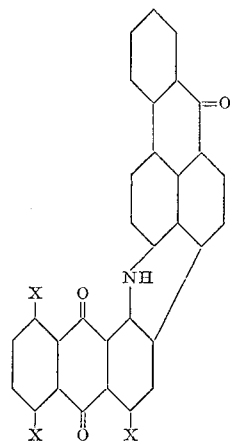

wherein two X's means hydrogen and one X represents the amino-group, with a vattable aromatic compound which contains in its molecule at least one replaceable halogen or nitro group.

We claim:

1. A process for producing nitrogenous vat dyestuffs which comprises condensing a 3. A process for producing nitrogenous vat dyestuffs which comprises condensing a product corresponding to the probable formula

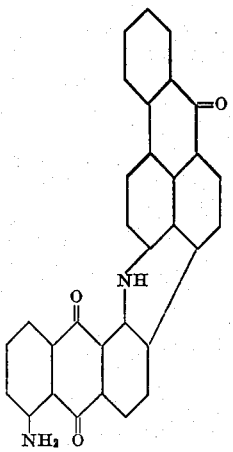

with a vattable aromatic compound which contains in its molecule at least one replaceable halogen or nitro group.

4. A process for producing nitrogenous vat dyestuffs which comprises condensing a product corresponding to the probable formula

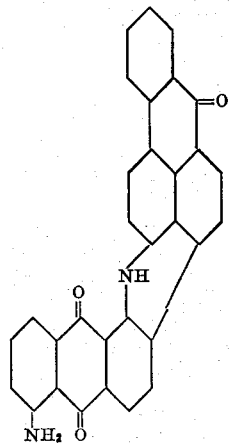

with a vattable compound of the anthraquinone series which contains in its molecule at least one replaceable halogen or nitro group.

In testimony whereof, we affix our signatures.

ERNST HONOLD.
GEORG BOEHNER.